United States Patent
Inoue (10) Patent No.: US 12,262,113 B2
(45) Date of Patent: Mar. 25, 2025

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Koji Inoue, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 201 days.

(21) Appl. No.: 18/192,816

(22) Filed: Mar. 30, 2023

(65) Prior Publication Data

US 2023/0319403 A1 Oct. 5, 2023

(30) Foreign Application Priority Data

Mar. 31, 2022 (JP) ................................. 2022-057991

(51) Int. Cl.
*H04N 23/67* (2023.01)
*G03B 13/36* (2021.01)

(52) U.S. Cl.
CPC ........... *H04N 23/672* (2023.01); *G03B 13/36* (2013.01)

(58) Field of Classification Search
CPC .............................. H04N 23/672; G03B 13/36
See application file for complete search history.

(56) References Cited

U.S. PATENT DOCUMENTS

2015/0319412 A1* 11/2015 Koshiba ................. H04N 25/68 348/246
2017/0353678 A1* 12/2017 Ogushi ................ H04N 25/589

FOREIGN PATENT DOCUMENTS

| EP | 1085751 B1 | 11/2012 |
| JP | 2001-083407 A | 3/2001 |
| JP | 2010139734 A | 6/2010 |

* cited by examiner

*Primary Examiner* — Mekonnen D Dagnew
(74) *Attorney, Agent, or Firm* — Venable LLP (57) ABSTRACT

A control apparatus includes an acquiring unit configured to acquire a position of an optical system based on an image signal, and a predicting unit configured to predict an in-focus position of the optical system based on the position acquired by the acquiring unit. The acquiring unit acquires the position of the optical system by performing interpolation processing in a range equal to or wider than an interval between first accumulation center time for a first frame in the image signal and second accumulation center time for a second frame in the image signal.

9 Claims, 7 Drawing Sheets

CONTROL APPARATUS, IMAGE PICKUP APPARATUS, CONTROL METHOD, AND STORAGE MEDIUM

BACKGROUND

Technical Field

One of the aspects of the disclosure relates to an image pickup apparatus.

Description of the Related Art

Japanese Patent Laid-Open No. (JP) 2001-083407 discloses an autofocus (AF) control of a phase difference method (imaging-plane phase-difference method) using a pair of image signals (AF signals) output from an image sensor. JP 2010-139734 discloses a moving object prediction AF method for predicting an in-focus position during exposure based on a focus detection result before exposure is started.

However, the method disclosed in JP 2010-139734 is more susceptible to lens driving, because an accumulation time becomes longer in a case where frame addition is performed. As disclosed in JP 2010-139734, in a case where interpolation is performed using lens positions acquired before and after the accumulation center, a calculated lens position at the accumulation center time does not reflect the influence of the lens driving. Thus, highly accurate AF control using the imaging-plane phase-difference method disclosed in JP 2001-083407 cannot be performed.

SUMMARY

One of the aspects of the embodiment provides a control apparatus that can provide highly accurate AF control in a case where frame addition is performed.

A control apparatus according to one aspect of the disclosure includes at least one processor, and a memory coupled to the at least one processor. The memory has instructions that, when executed by the processor, perform operations as an acquiring unit configured to acquire a position of an optical system based on an image signal, and a predicting unit configured to predict an in-focus position of the optical system based on the position acquired by the acquiring unit. The acquiring unit acquires the position of the optical system by performing interpolation processing in a range equal to or wider than an interval between first accumulation center time for a first frame in the image signal and second accumulation center time for a second frame in the image signal. An image pickup apparatus having the above control apparatus, a control method corresponding to the above control apparatus, and a storage medium storing a program that causes a computer to execute the above control method also constitute another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Referring now to the accompanying drawings, a detailed description will be given of embodiments according to the disclosure.

Figure 1:
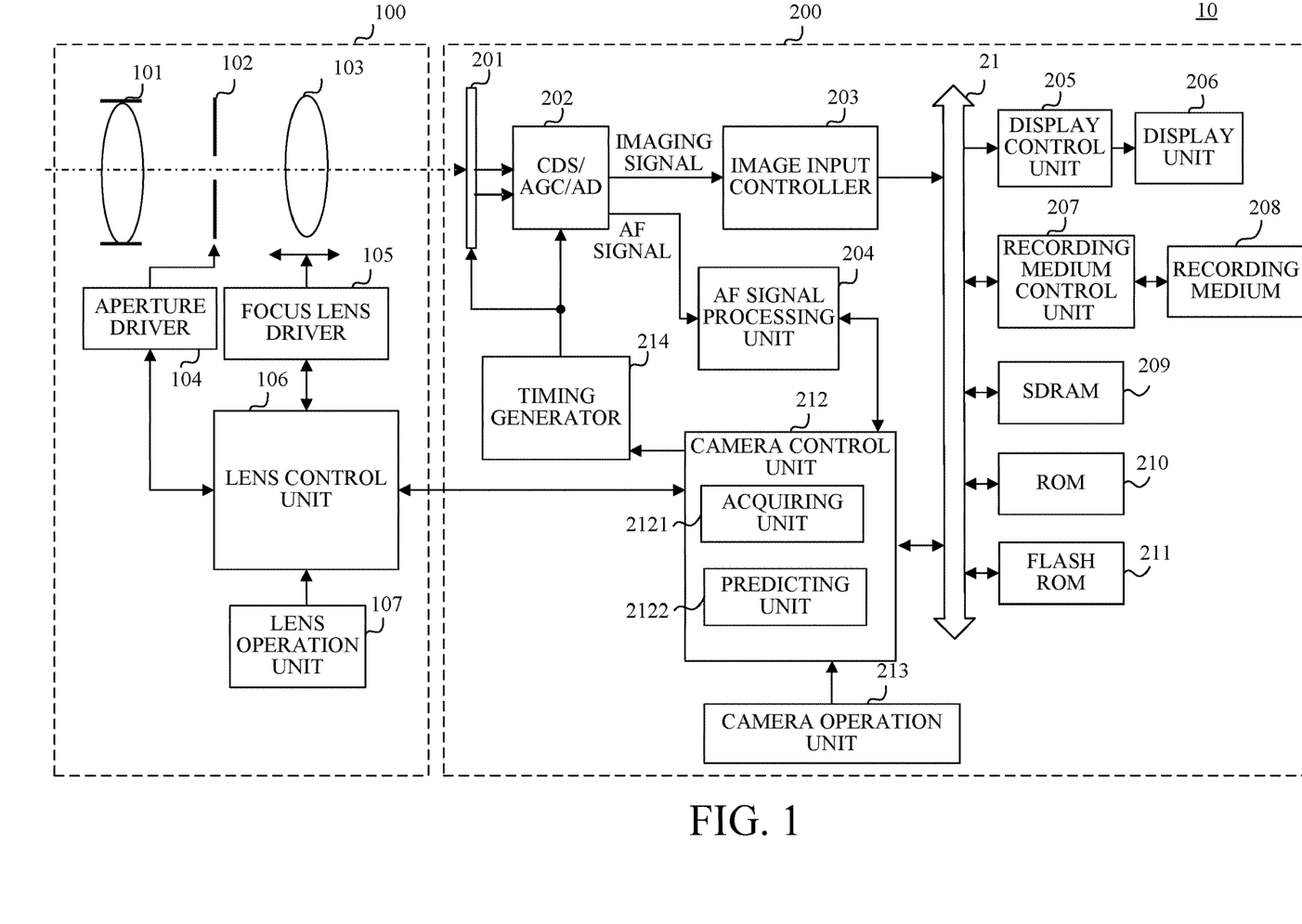
FIG. 1 is a block diagram of an imaging system according to each embodiment.

Referring now to FIG. 1, a description will be given of an imaging system 10 according to each embodiment. The imaging system 10 is a lens interchangeable type camera system that includes a camera body (image pickup apparatus) 200 and a lens apparatus (interchangeable lens) 100 attachable to and detachable from the camera body 200. In the imaging system 10, a lens control unit 106 configured to control the entire operation of the lens apparatus 100 and a camera control unit 212 configured to control the entire operation of the camera body 200 communicate information. Each embodiment is also applicable to an image pickup apparatus in which a camera body and a lens apparatus are integrated.

A description will now be given of the configuration of the lens apparatus 100. The lens apparatus 100 includes a fixed lens 101, an aperture stop (diaphragm) 102, a focus lens 103, an aperture driver 104, a focus lens driver 105, the lens control unit 106, and a lens operation unit 107. The fixed lens 101, the aperture stop 102, and the focus lens 103 constitute an imaging optical system.

The aperture stop 102 is driven by the aperture driver 104 and controls a light amount incident on an image sensor 201, which will be described below. The focus lens 103 is driven by the focus lens driver 105 and performs focusing for an image formed on the image sensor 201. The aperture driver 104 and the focus lens driver 105 are controlled by the lens control unit 106 and determine an aperture amount of the aperture stop 102 and the position of the focus lens 103. The lens control unit 106 controls the aperture driver 104 or the focus lens driver 105 according to a control command (camera control information) received from the camera control unit 212. The lens control unit 106 also transmits lens control information to the camera control unit 212.

A description will now be given of the configuration of the camera body 200. The image sensor 201 is a photoelectric conversion element such as a CMOS sensor or a CCD sensor, and photoelectrically converts an object image (optical image) formed via the imaging optical system. The image sensor 201 can perform focus detection (imaging-plane phase-difference AF) by an imaging-plane phase-difference detecting method. The imaging-plane phase-difference AF performs focusing at a high speed and with high accuracy during imaging while the user is viewing a live-view image generated by the imaging system 10. Thus, the image sensor 201 performs pupil division that provides two light-receiving elements (photodiodes) and one microlens to each pixel and receives light from different areas on the exit pupil in the imaging optical system through the one microlens and two photodiodes. Thereby, the image sensor 201 is configured to extract two signals (imaging signal and AF signal) for imaging and focus detection (AF).

A signal charge accumulated in each photodiode is sequentially read out of the image sensor 201 as a voltage signal corresponding to the signal charge by a driving pulse output from a timing generator 214 in accordance with a command from the camera control unit 212. A signal (A+B) obtained by adding signals from the two photodiodes is the imaging signal, and signals (A, B) from individual photodiodes are a pair of image signals for the AF (AF signals). An AF signal processing unit 204 performs a correlation operation for the pair of image signals generated by the outputs from the two photodiodes in a plurality of pixels, and calculates an image shift amount (phase difference) and various types of reliability information. Thereby, the camera control unit 212 acquires a defocus amount, and obtains an in-focus state by controlling the position of the focus lens 103 based on the defocus amount.

The imaging signals read out of the image sensor 201 are input to a correlated double sampling (CDS)/auto gain control (AGC)/analog-to-digital (AD) converter 202, which performs correlated double sampling to remove reset noise, gain control, and signal digitization. The CDS/AGC/AD converter 202 outputs imaging signals to an image input controller 203. The image input controller 203 stores the imaging signals output from the CDS/AGC/AD converter 202 in an SDRAM 209.

The image signal stored in the SDRAM 209 is displayed on a display unit 206 by a display control unit 205 via a bus 21. In a recording mode of the imaging signal, the imaging signal is recorded in a recording medium 208 by a recording medium control unit 207. A ROM 210 connected via the bus 21 stores a control program to be executed by the camera control unit 212 and various data necessary for control. A flash ROM 211 stores various setting information relating to the operation of the camera body 200 such as user setting information.

The AF signal processing unit 204 performs pixel addition and correlation calculation for the AF signals, and calculates an image shift amount and reliability information (two-image matching level, two-image steepness, contrast information, saturation information, flaw information, etc.). The image shift amount and reliability information calculated by the AF signal processing unit 204 are output to the camera control unit 212. The camera control unit 212 notifies the AF signal processing unit 204 of a change in settings for calculating the image shift amount and the reliability information based on the acquired image shift amount and reliability information. For example, in a case where the image shift amount is large, a correlation calculating area is set wide, or a type of bandpass filter is changed according to the contrast information.

The camera control unit 212 communicates information with each unit in the camera body 200 and controls each unit. The camera control unit 212 performs various user-operated camera functions in accordance with not only processing in the camera body 200 but also an input from the camera operation unit 213, such as turning on and off a power supply, changing a setting, starting still or moving image recording, and starting AF control, and confirming a recorded image. The camera control unit 212 communicates information with the lens control unit 106 in the lens apparatus 100, sends a control instruction (control information) to the lens apparatus 100, and obtains information from the lens apparatus 100, as described above. The camera control unit 212 includes an acquiring unit 2121 and a predicting unit 2122. The acquiring unit 2121 acquires a position (lens position) of the imaging optical system based on the image signal. The predicting unit 2122 predicts an in-focus position of the imaging optical system based on the lens position acquired by acquiring unit 2121.

In each embodiment, the camera control unit 212 can set a mode that performs frame addition for the image signal and a mode that does not perform frame addition. The frame addition means generating an image signal whose frame rate becomes (1/n)-fold by adding image signals of a plurality of frames (n frames).

COMPARATIVE EXAMPLE

Figure 2:
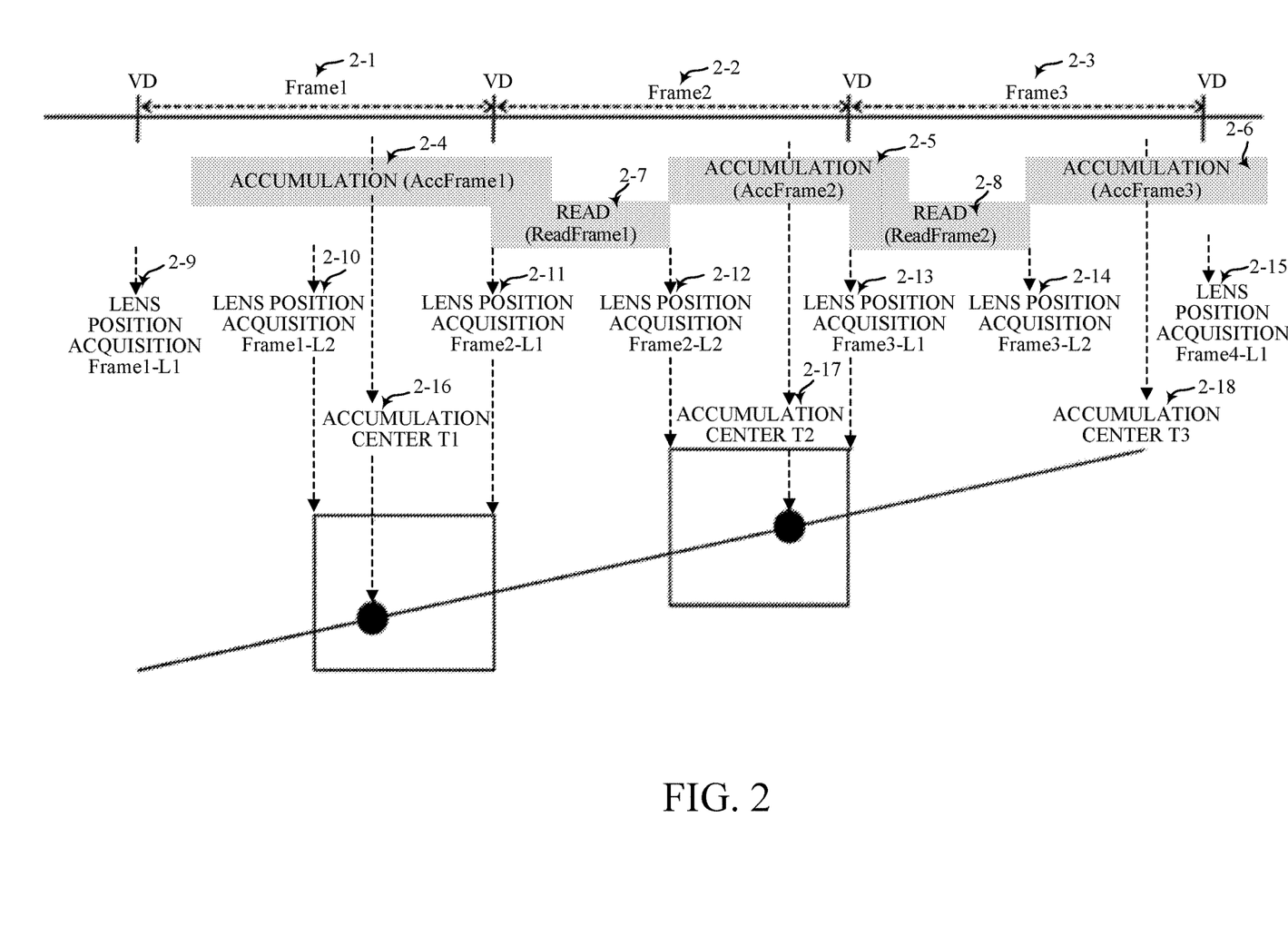
FIG. 2 explains an operation of an image pickup apparatus according to a comparative example.
Figure 3:
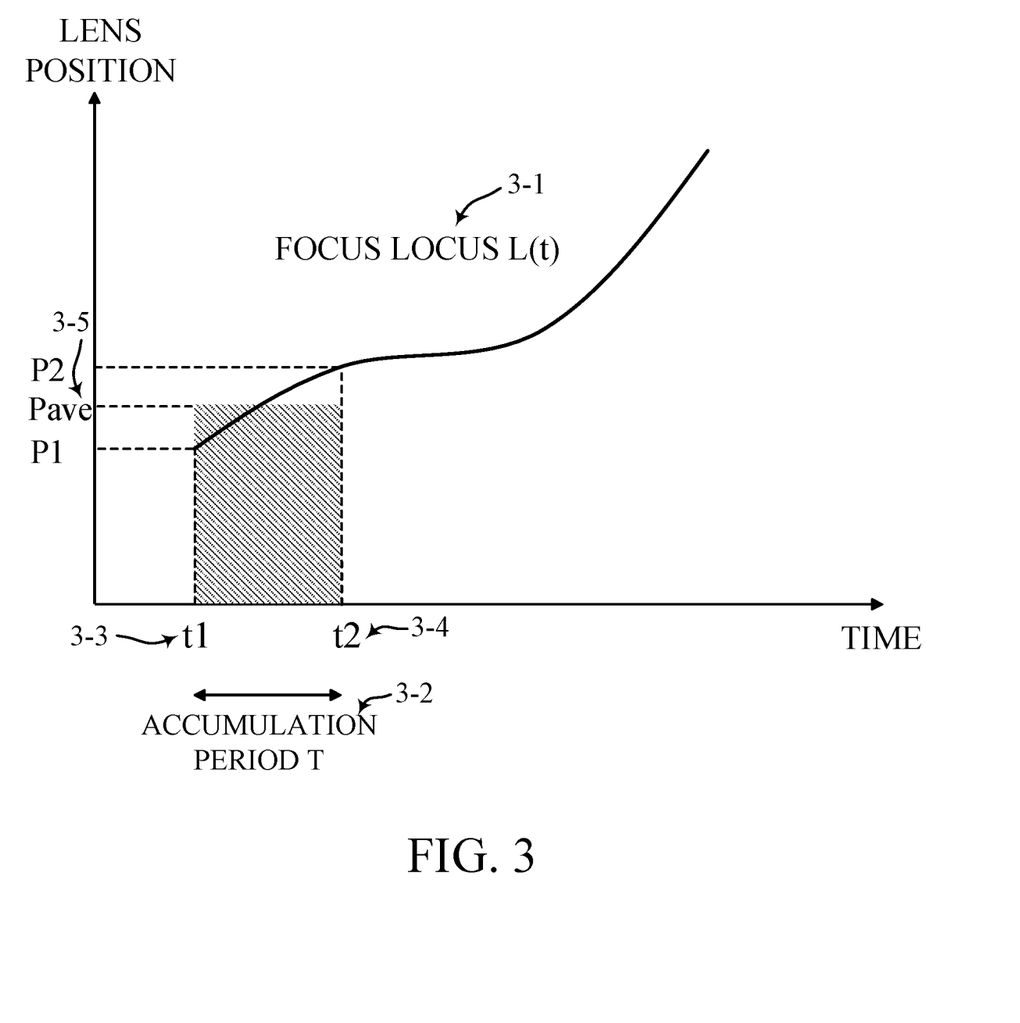
FIG. 3 explains the operation of the image pickup apparatus according to the comparative example.
Figure 4:
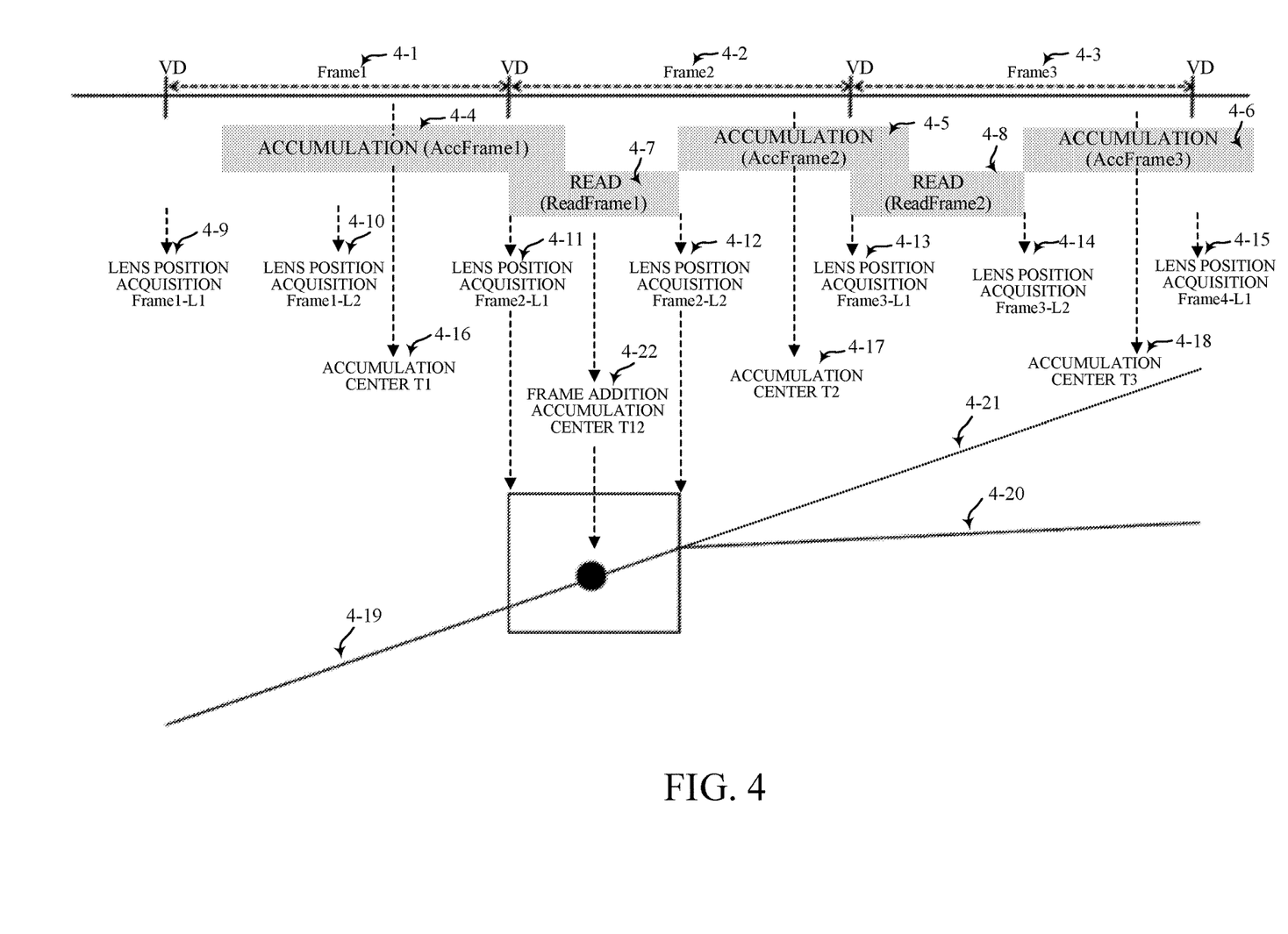
FIG. 4 explains the operation of the image pickup apparatus according to the comparative example.

Referring now to FIGS. 2 to 4, a description will be given of the operation of the image pickup apparatus according to a comparative example. FIGS. 2 to 4 explain the operation of the image pickup apparatus according to the comparative example.

The moving object prediction AF disclosed in JP 2010-139734 performs prediction calculation using the past focus detection result that tags a defocus amount during focus detection in each frame in a live-view image, an accumulation center time, and a lens position at the accumulation center time. The lens position is controlled based on the prediction calculation result so that the next frame center position is focused. The accumulation time is short without frame addition (addition processing of a plurality of continuous frames). Therefore, the lens position at the accumulation center time can be calculated with high accuracy because the error is small even if the lens position is interpolated from the lens positions acquired before and after the accumulation center time.

FIG. 2 illustrates a method of calculating a lens position at the accumulation center time in a case where frame addition is not performed. Live-view frames are illustrated as Frame1 (2-1), Frame2 (2-2), and Frame3 (2-3). Accumulations (AccFrame1, AccFrame2, and AccFrame3) as accumulation times, and reads (ReadFrame1 (2-7) and ReadFrame2 (2-8)) as read times of the accumulated signals are set for each frame. The accumulation time for each frame is determined at the start timing of each frame. In FIG. 2, lens position acquisition frame 1-L1 to frame4-L1 (2-9 to 2-15)

indicate that a lens position is periodically acquired. Lens positions at accumulation centers T1 (2-16), T2 (2-17), and T3 (2-18) of these frames are calculated by interpolation using the preceding and following lens position acquiring timings. Since the accumulation time of each frame is short, a lens position can be calculated with high accuracy without being affected by lens driving.

FIG. 3 illustrates a method of calculating a lens position at the accumulation center. In FIG. 3, the horizontal axis represents time, and the vertical axis represents a lens position. A representative lens position Pave (3-5) corresponding to defocus in accumulation period T (3-2) is calculated based on accumulation start time t1 (3-3) and accumulation end time t2 (3-4) of the accumulation period T (3-2), and the following equation (1). A focus locus L(t) (3-1) can be approximated by a straight line because the accumulation period T (3-2) is short in a case where frame addition is not performed.

$$Pave = \int_{t1 \sim t2} L(t)dt/T \approx ((P1+P2)*T/2)/T = (P1+P2)/2 \quad (1)$$

However, the method according to the comparative example is susceptible to the influence of lens driving in a case where frame addition is performed because the accumulation time becomes longer. If interpolation is performed using lens positions acquired before and after the accumulation center, a lens position at the accumulation center time may be calculated that does not reflect the influence of the lens driving. Thus, while a defocus amount reflects the influence of the lens driving during accumulation, the lens position at the accumulation center time does not reflect the influence of the lens driving and the prediction calculation (moving object prediction AF) may contain errors and cause an excessive response. As a result, highly accurate AF control may not be able to be performed.

In FIG. 4, during accumulation for period frame1 (4-1), the lens is driven as indicated by straight line 4-19. If the lens driving does not change, the lens would be driven as illustrated by straight line 4-21. Straight line 4-20 indicates lens driving when the lens approaches a target position and a lens driving speed decreases, for example. In a case where frame addition is performed during accumulations (AccFrame1 (4-4) and AccFrame2 (4-5)) in this lens driving, the accumulation (AccFrame2 (4-5)) reflects the defocus amount affected by the decreased lens driving speed.

However, in a case where a lens position is interpolated using lens positions before and after the accumulation center time (lens position acquisitions Frame2-L1 and Frame2-L2), the lens position is interpolated under the lens driving at the accumulation center time as if the lens position follows the lens driving that does not change, as illustrated in the straight line 4-21. That is, the lens position at an accumulation center time (frame addition accumulation center T12 (4-22)) does not reflect the influence of lens driving, whereas the defocus amount is affected by the lens driving. As a result, the prediction calculation (moving object prediction AF) has errors and causes an excessive response or the like, and highly accurate AF control cannot be performed.

Accordingly, each embodiment performs highly accurate AF control by reducing prediction calculation errors even in a case where the frame addition is performed. A description will now be given of each embodiment.

First Embodiment

Figure 5:
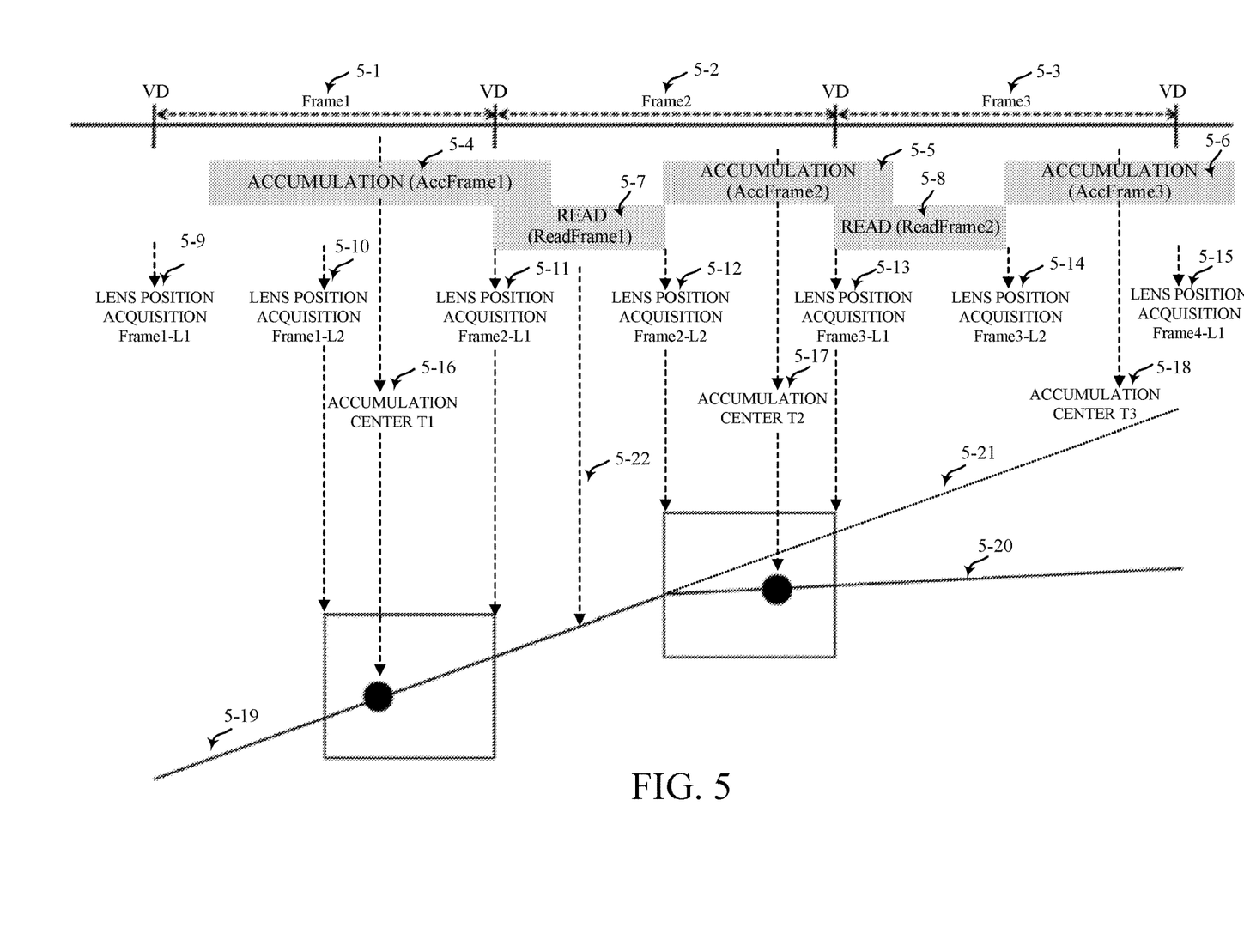
FIG. 5 explains the operation of an image pickup apparatus according to a first embodiment.

Referring now to FIG. 5, a description will be given of the operation of the imaging system 10 (control method of the imaging system 10) according to a first embodiment. FIG. 5 explains the operation of the imaging system 10 according to this embodiment.

In FIG. 5, reference numeral 5-1 denotes a live-view frame (frame1), reference numeral 5-2 denotes a live-view frame (frame2), and reference numeral 5-3 denotes a live-view frame (frame3), respectively. Reference numeral 5-4 denotes accumulation (AccFrame1) for frame1, reference numeral 5-5 denotes accumulation (AccFrame2) for frame2, and reference numeral 5-6 denotes accumulation (AccFrame3) for frame3, respectively. The accumulation time is determined at the timing of a head VD of each frame.

Reference numeral 5-7 denotes read (ReadFrame1) of a signal accumulated in the accumulation (AccFrame1) for frame1, and reference numeral 5-8 indicates read (ReadFrame2) of a signal accumulated in the accumulation (AccFrame2) for frame2, respectively. Reference numerals 5-9 to 5-15 are illustrated timings for periodically acquiring a lens position (lens position acquisitions (frame1-L1, frame1-L2, frame2-L1, frame2-L2, frame3-L1, frame3-L2, and frame4-L1)). Reference numeral 5-16 denotes accumulation center T1 of the accumulation (AccFrame1) for frame1, and reference numeral 5-17 denotes accumulation center T2 of the accumulation (AccFrame2) for frame2, respectively.

This embodiment calculates the accumulation center T1 for frame1 using linear interpolation (using straight line 5-19) based on the previous and subsequent lens position acquiring timings (acquiring times and lens positions acquired by the lens position acquisitions (frame1-L2 and frame2-L1)). In addition, this embodiment calculates the accumulation center T2 for frame2 using linear interpolation (using straight line 5-20) based on the previous and subsequent lens position acquiring timings (acquiring times and lens positions acquired by the lens position acquisitions (frame2-L2 and frame3-L1)). Thereby, a lens position can be acquired at the accumulation center T2 that reflects the influence of the lens driving during the accumulation (AccFrame2) for frame2. In addition, this embodiment can calculate a lens position at accumulation center timing 5-22 during frame addition based on the acquired timing and lens position at the accumulation center T1 for frame1 and the acquired timing and lens position at accumulation center T2 for frame2.

In a case where the frame addition is performed that adds the first frame and the second frame, this embodiment performs interpolation processing in a range equal to or wider than an interval between the accumulation center time of the first frame and the accumulation center time of the second frame and calculates the addition frame accumulation center time. That is, the acquiring unit 2121 performs interpolation processing in a range equal to or wider than the interval between the first central accumulation time (T1) for the first frame in the image signal and the second central accumulation time (T2) for the second frame in the image signal and acquires a position of the imaging optical system (focus lens 103). In a case where frame addition is performed, the acquiring unit 2121 may perform interpolation processing using the positions of the optical system at each of the first accumulation center time and the second accumulation center time and determines the position of the optical system at the accumulation center time (5-22) for the added frames. On the other hand, in a case where frame addition is not performed, the acquiring unit 2121 determines the position of the optical system at each of the first central accumulation time and the second central accumulation time based on periodically acquired positions of the imaging optical system. The image signal may be based on the signal output from the image sensor 201.

As a result, the lens position at the accumulation center timing in a case where frame addition is performed can reflect the influence of lens driving, while the defocus amount is affected by lens driving. Therefore, this embodiment can reduce prediction calculation errors, and perform highly accurate AF control.

Second Embodiment

Figure 6:
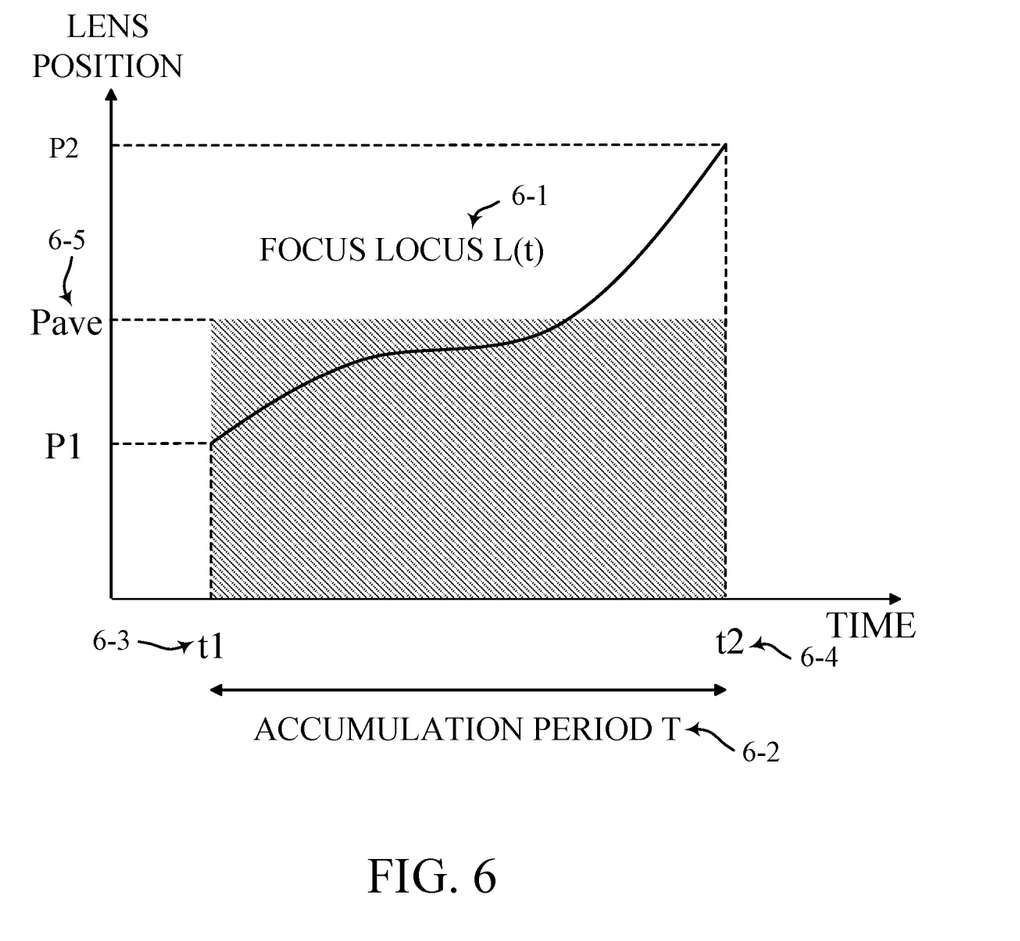
FIG. 6 explains the operation of an image pickup apparatus according to a second embodiment.
Figure 7:
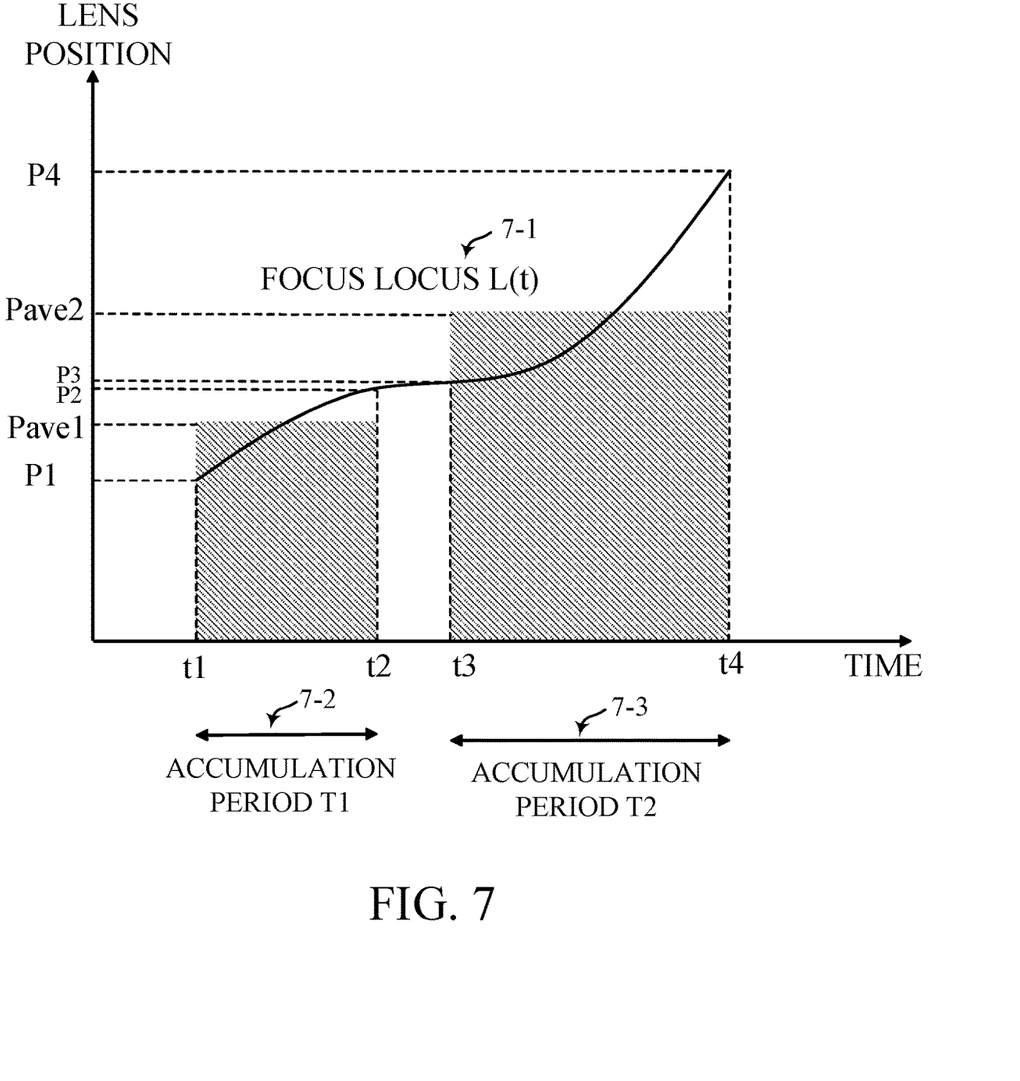
FIG. 7 explains the operation of the image pickup apparatus according to the second embodiment.

Referring now to FIGS. 6 and 7, a description will be given of the operation of the imaging system 10 (control method of the imaging system 10) according to a second embodiment. FIGS. 6 and 7 explain the operation of the imaging system 10 according to this embodiment.

FIG. 6 illustrates a method of calculating a lens representative position Pave corresponding to defocus during accumulation period T (6-2). In FIG. 6, the horizontal axis represents time, and the vertical axis represents a lens position. In the first embodiment, the accumulation time for each frame is short, and good accuracy is maintained even if lens positions are periodically acquired at lens position acquisition timings 5-9 to 5-15 and linearly interpolated. On the other hand, this embodiment will discuss interpolation processing (calculation of a lens representative position) in acquiring information on a focus locus L(t) in order to further improve accuracy.

In FIG. 6, reference numeral 6-1 denotes the focus locus L(t) acquired from the lens apparatus 100. Reference numeral 6-3 denotes accumulation start time t1 of the accumulation period T (6-2), and reference numeral 6-4 denotes accumulation end time t2 of the accumulation period T. At this time, the lens representative position Pave (6-5) corresponding to the defocus amount during the accumulation period T is calculated by the following equation (1):

$$\text{Pave} = \int_{t1 \sim t2} L(t)dt/T \quad (1)$$

FIG. 7 illustrates a method of calculating a lens representative position Pave in a case where frame addition is performed for accumulation period T1 (7-2) and accumulation period T2 (7-3). In FIG. 7, the horizontal axis represents time, and the vertical axis represents a lens position. In FIG. 7, reference numeral 7-1 denotes a focus locus L(t) acquired from the lens apparatus 100. The accumulation period T1 (7-2) is a period between accumulation start time t1 and accumulation end time t2. The accumulation period T2 (7-3) is a period between accumulation start time t3 and accumulation end time t4. In a case where frame addition is performed, this embodiment calculates the lens representative position Pave by the following equation (2) using the focus locus L(t) acquired during accumulation of each frame.

$$\text{Pave} = \left( \int_{t1-t2} L(t)dt + \int_{t3-t4} L(t)dt/(T1+T2) \right) = \\ \left( \int_{t1-t2} L(t)dt/T1 \right) * T1/(T1+T2) + \left( \int_{t3-t4} L(t)dt/T2 \right) * T2/(T1+T2) = \\ Pave1 * T1/(T1+T2) + Pave2 * T2/(T1+T2) \quad (2)$$

That is, the representative lens position Pave for the defocus amount acquired by the frame addition is represented by the weighted sum of the accumulation times for representative lens positions Pave1 and Pave2 of the respective frames. This is similarly applicable to the addition of three or more frames.

In frame addition that adds the first frame and the second frame, this embodiment performs interpolation processing in a range equal to or wider than an interval between the central accumulation time for the first frame and the central accumulation time for the second frame and calculates the accumulation center time for the added frames. In a case where frame addition is performed, the acquiring unit 2121 determines a first position (Pave1) of the imaging optical system at the first accumulation center time and determines a second position (Pave2) of the imaging optical system at the second accumulation center time. The acquiring unit 2121 may determine a third position (Pave) of the imaging optical system at the accumulation center time of the added frames based on the first position and the second position. The acquiring unit 2121 may acquire the third position by a weighted sum of the first accumulation period (T1) for the first frame and the second accumulation period (T2) for the second frame using the first position and the second position.

As a result, the lens position at the accumulation center timing can reflect the influence of lens driving, while the defocus amount is affected by the lens driving. Therefore, this embodiment can reduce prediction calculation errors, and perform highly accurate AF control.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

Each embodiment can provide a control apparatus, an image pickup apparatus, a control method, and a storage medium, each of which can perform highly accurate AF control in frame addition.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-057991, filed on Mar. 31, 2022, which is hereby incorporated by reference herein in its entirety.

What is claimed is:

1. A control apparatus comprising:
at least one processor; and
a memory coupled to the at least one processor,
wherein the memory has instructions that, when executed by the processor, perform operations as:
an acquiring unit configured to acquire a position of an optical system based on an image signal; and
a predicting unit configured to predict an in-focus position of the optical system based on the position acquired by the acquiring unit,
wherein the acquiring unit acquires the position of the optical system by performing interpolation processing in a range equal to or wider than an interval between first accumulation center time for a first frame in the image signal and second accumulation center time for a second frame in the image signal.

2. The control apparatus according to claim 1, wherein in a case where frame addition is performed that adds the first frame and the second frame, the acquiring unit determines the position of the optical system at accumulation center time of added frames through the interpolation processing using the position of the optical system at the first accumulation center time and the position of the optical system at the second accumulation center time.

3. The control apparatus according to claim 2, wherein in a case where the frame addition is not performed, the acquiring unit determines the position of the optical system at each of the first accumulation center time and the second accumulation center time based on periodically acquired positions of the optical system.

4. The control apparatus according to claim 1, wherein in a case where frame addition is performed that adds the first frame and the second frame, the acquiring unit determines a first position of the optical system at the first accumulation center time, determines a second position of the optical system at the second accumulation center time, and determines a third position of the optical system at an accumulation center time of added frames based on the first position and the second position.

5. The control apparatus according to claim 4, wherein the acquiring unit determines the third position by a weighted sum of a first accumulation period for the first frame and a second accumulation period for the second frame using the first position and the second position.

6. The control apparatus according to claim 1, wherein the image signal is based on a signal output from an image sensor.

7. The image pickup apparatus comprising:
an image sensor;
a control apparatus,
wherein the control apparatus includes:
at least one processor; and
a memory coupled to the at least one processor,
wherein the memory has instructions that, when executed by the processor, perform operations as:
an acquiring unit configured to acquire a position of an optical system based on an image signal; and
a predicting unit configured to predict an in-focus position of the optical system based on the position acquired by the acquiring unit,
wherein the acquiring unit acquires the position of the optical system by performing interpolation processing in a range equal to or wider than an interval between first accumulation center time for a first frame in the image signal and second accumulation center time for a second frame in the image signal.

8. A control method comprising:
an acquiring step configured to acquire a position of an optical system based on an image signal; and
a predicting step configured to predict an in-focus position of the optical system based on the position acquired by the acquiring unit,
wherein the acquiring step acquires the position of the optical system by performing interpolation processing in a range equal to or wider than an interval between first accumulation center time for a first frame in the image signal and second accumulation center time for a second frame in the image signal.

9. A non-transitory computer-readable storage medium a program that causes a computer to execute the control method according to claim 8.

* * * * *